(12) United States Patent
Foley et al.

(10) Patent No.: US 9,172,720 B2
(45) Date of Patent: Oct. 27, 2015

(54) DETECTING MALWARE USING REVISION CONTROL LOGS

(71) Applicant: Bank of America Corporation, Charlotte, NC (US)

(72) Inventors: Alexander G. Foley, Charlotte, NC (US); Peter J. Langsam, San Francisco, CA (US); Ronald Read, Avondale, PA (US)

(73) Assignee: Bank of America Corporation, Charlotte, NC (US)

( * ) Notice: Subject to any disclaimer, the term of this patent is extended or adjusted under 35 U.S.C. 154(b) by 5 days.

(21) Appl. No.: 14/014,754

(22) Filed: Aug. 30, 2013

(65) Prior Publication Data

US 2015/0067861 A1    Mar. 5, 2015

(51) Int. Cl.
*H04L 29/06* (2006.01)
*G06F 21/56* (2013.01)

(52) U.S. Cl.
CPC .............. *H04L 63/145* (2013.01); *G06F 21/56* (2013.01)

(58) Field of Classification Search
CPC .............................. G06F 21/56; H04L 63/145
USPC ...................................................... 726/22–25
See application file for complete search history.

(56) References Cited

U.S. PATENT DOCUMENTS

| | | | |
|---|---|---|---|
| 6,757,893 B1 * | 6/2004 | Haikin | 717/170 |
| 2002/0046275 A1 * | 4/2002 | Crosbie et al. | 709/224 |
| 2005/0044401 A1 * | 2/2005 | Morrow et al. | 713/200 |
| 2006/0015741 A1 | 1/2006 | Carroll | |
| 2006/0294589 A1 * | 12/2006 | Achanta et al. | 726/24 |
| 2008/0172422 A1 * | 7/2008 | Li et al. | 707/202 |
| 2008/0244686 A1 * | 10/2008 | Li et al. | 726/1 |
| 2010/0114634 A1 * | 5/2010 | Christiansen et al. | 705/7 |
| 2012/0079598 A1 * | 3/2012 | Brock et al. | 726/25 |
| 2012/0123949 A1 * | 5/2012 | Gupta | 705/301 |
| 2013/0036400 A1 * | 2/2013 | Bak et al. | 717/101 |
| 2013/0185697 A1 * | 7/2013 | Farchi et al. | 717/113 |
| 2013/0275931 A1 | 10/2013 | Moffitt | |
| 2013/0282770 A1 | 10/2013 | Sidman | |
| 2013/0290347 A1 | 10/2013 | Saib | |
| 2013/0290470 A1 | 10/2013 | CaraDonna et al. | |
| 2013/0291060 A1 | 10/2013 | Moore | |
| 2013/0291086 A1 | 10/2013 | Pontillo et al. | |
| 2013/0297658 A1 | 11/2013 | Guarraci | |
| 2013/0297668 A1 | 11/2013 | McGrath et al. | |
| 2013/0297672 A1 | 11/2013 | McGrath et al. | |
| 2013/0297673 A1 | 11/2013 | McGrath et al. | |
| 2013/0297685 A1 | 11/2013 | McGrath et al. | |
| 2013/0297795 A1 | 11/2013 | McGrath et al. | |
| 2013/0297973 A1 | 11/2013 | Hyland et al. | |
| 2013/0298183 A1 | 11/2013 | McGrath et al. | |

(Continued)

*Primary Examiner* — Joseph P Hirl
*Assistant Examiner* — J. Brant Murphy
(74) *Attorney, Agent, or Firm* — Banner & Witcoff, Ltd.; Michael A. Springs

(57) ABSTRACT

Methods, systems, computer-readable media, and apparatuses for detecting malware using revision control logs are presented. In some embodiments, a computing device may gather one or more revision control logs, and the one or more revision control logs may identify one or more code changes. Subsequently, the computing device may determine, based on one or more risk factors, that at least one code change identified in the one or more revision control logs is potentially malicious. Based on determining that the at least one code change is potentially malicious, the computing device may generate a notification indicating that the at least one code change is potentially malicious.

21 Claims, 5 Drawing Sheets

(56) References Cited

U.S. PATENT DOCUMENTS

| | | |
|---|---|---|
| 2013/0304616 A1 | 11/2013 | Raleigh et al. |
| 2013/0305060 A9 | 11/2013 | Resch et al. |
| 2013/0308492 A1 | 11/2013 | Baphna et al. |
| 2013/0325789 A1 | 12/2013 | Krishnan et al. |
| 2013/0326506 A1 | 12/2013 | McGrath et al. |
| 2013/0326507 A1 | 12/2013 | McGrath et al. |
| 2013/0326585 A1 | 12/2013 | Lo et al. |
| 2013/0338971 A1 | 12/2013 | Chao et al. |
| 2013/0338972 A1 | 12/2013 | Chao et al. |
| 2013/0339847 A1 | 12/2013 | Bartek et al. |
| 2013/0340076 A1 | 12/2013 | Cecchetti et al. |
| 2013/0345489 A1 | 12/2013 | Beloussov et al. |
| 2014/0006862 A1 | 1/2014 | Jain et al. |
| 2014/0006951 A1 | 1/2014 | Hunter |
| 2014/0013304 A1 | 1/2014 | Vangala et al. |
| 2014/0019854 A1 | 1/2014 | Alexander et al. |
| 2014/0047544 A1* | 2/2014 | Jakobsson ........................ 726/23 |

\* cited by examiner

DETECTING MALWARE USING REVISION CONTROL LOGS

BACKGROUND

Aspects of the disclosure relate to computer hardware and software. In particular, one or more aspects of the disclosure generally relate to computer hardware and software for detecting malware using revision control logs.

As software and computing technologies continue to play an increasingly large role in many businesses, large organizations, such as financial institutions, may have many software developers interacting with many different computer systems to develop and maintain many different internal and external software applications. Sometimes, however, certain developers within an organization may, for various reasons, attempt to attack the organization by embedding malware into the organization's software. This type of malware is sometimes called a "logic bomb," as it may be designed to take certain malicious actions and/or execute certain commands at a particular time and/or under particular circumstances, typically after the developer who planted it is no longer working for the organization. Similarly, a developer may attempt to embed other types of malware into the organization's software, including viruses, worms, key loggers, back doors, and/or the like.

For an organization, finding and neutralizing logic bombs and other malware can be difficult. Not only do logic bombs often look like legitimate code in the midst of the source code in which they are planted, but because of the scale at which a large organization may develop software, such logic bombs and other malware can essentially be hidden amongst the vast amount of legitimate code that is maintained by the organization across various source code repositories and other systems for various applications that are developed and/or used by the organization.

SUMMARY

Aspects of the disclosure relate to various systems and techniques that provide effective, efficient, scalable, and convenient ways of detecting malware. In particular, some aspects of the disclosure provide ways of detecting logic bombs and other malware that may, for instance, be maliciously inserted into an organization's application source code by a software developer who works for the organization (e.g., as an employee, a contractor, and/or the like) and/or otherwise has legitimate rights to access and/or modify the application source code maintained in various source code repositories used by the organization.

For example, some embodiments discussed in greater detail below provide techniques for analyzing revision control logs to identify potentially malicious code changes. In particular, as developers make changes to source code maintained in various source code repositories, the changes may be analyzed by one or more automated systems, in some instances in view of one or more factors, in order to identify potentially malicious code changes. The one or more code changes that are identified as potentially malicious may then be flagged and subjected to additional review (e.g., manual review by a manager or team leader, by other developers, and/or others) to determine whether the code changes for each application are legitimate (in which case, e.g., the changes may be implemented in production code for the application) or actually malicious (in which case, e.g., the changes will not be implemented in the production code).

By leveraging various aspects of these techniques and/or the other features and functionalities discussed in greater detail below, logic bombs and other malware (which may, e.g., be planted by internal software developers) may be detected in more effective, efficient, scalable, and convenient ways, as various embodiments discussed in greater detail below can reduce the amount of resources that are consumed, as well as the amount of manual review that might otherwise be required, in detecting, identifying, and/or preventing logic bombs and other malware from harming an organization and/or users of the targeted software. Additionally, this can be achieved while providing improved recognition and/or handling of such logic bombs and other malware.

Thus, in some embodiments discussed below, a computing device may gather one or more revision control logs, and the one or more revision control logs may identify one or more code changes. Subsequently, the computing device may determine, based on one or more risk factors, that at least one code change identified in the one or more revision control logs is potentially malicious. Based on determining that the at least one code change is potentially malicious, the computing device may generate a notification indicating that the at least one code change is potentially malicious.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to detecting malware using revision control logs. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
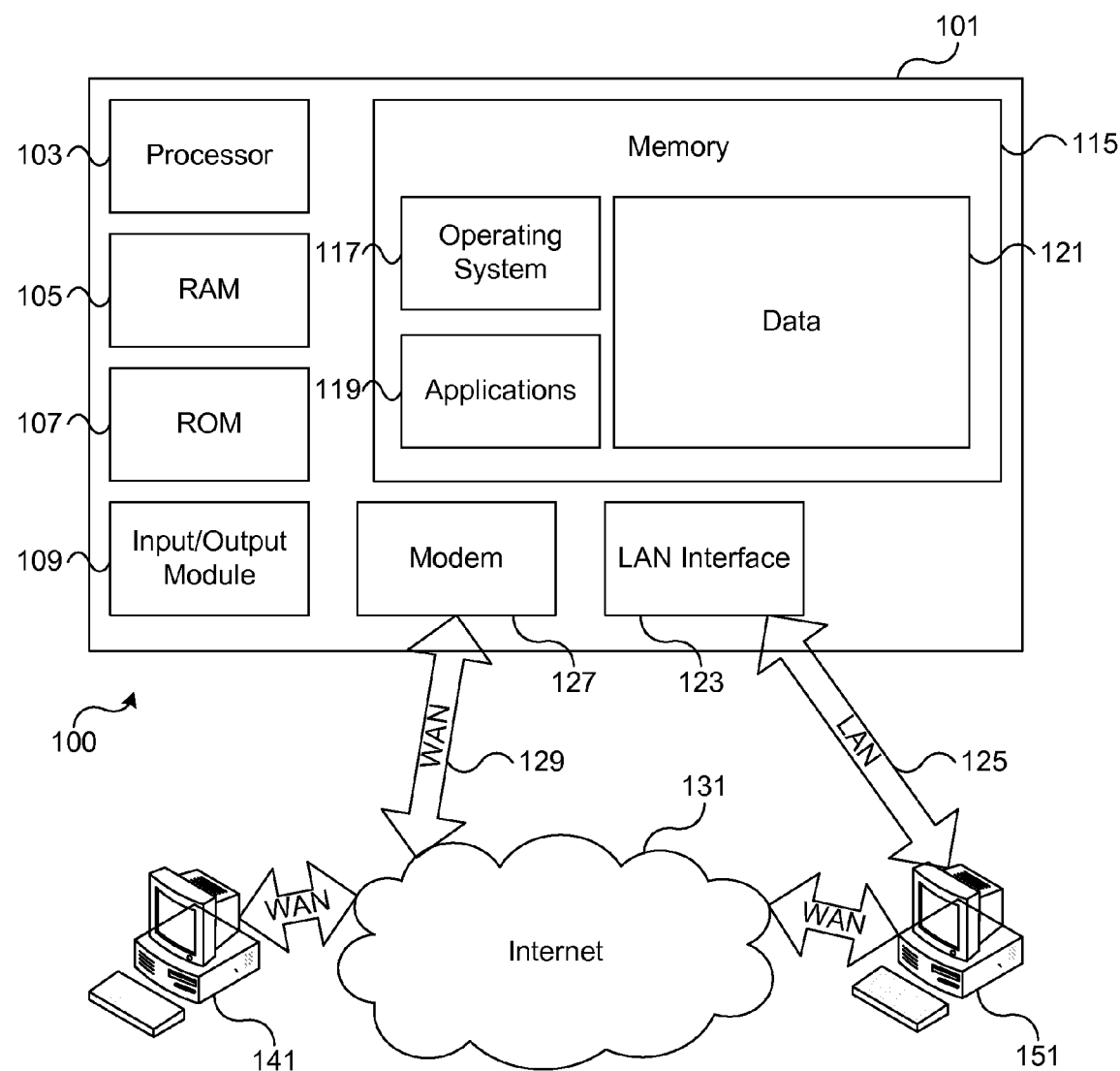
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
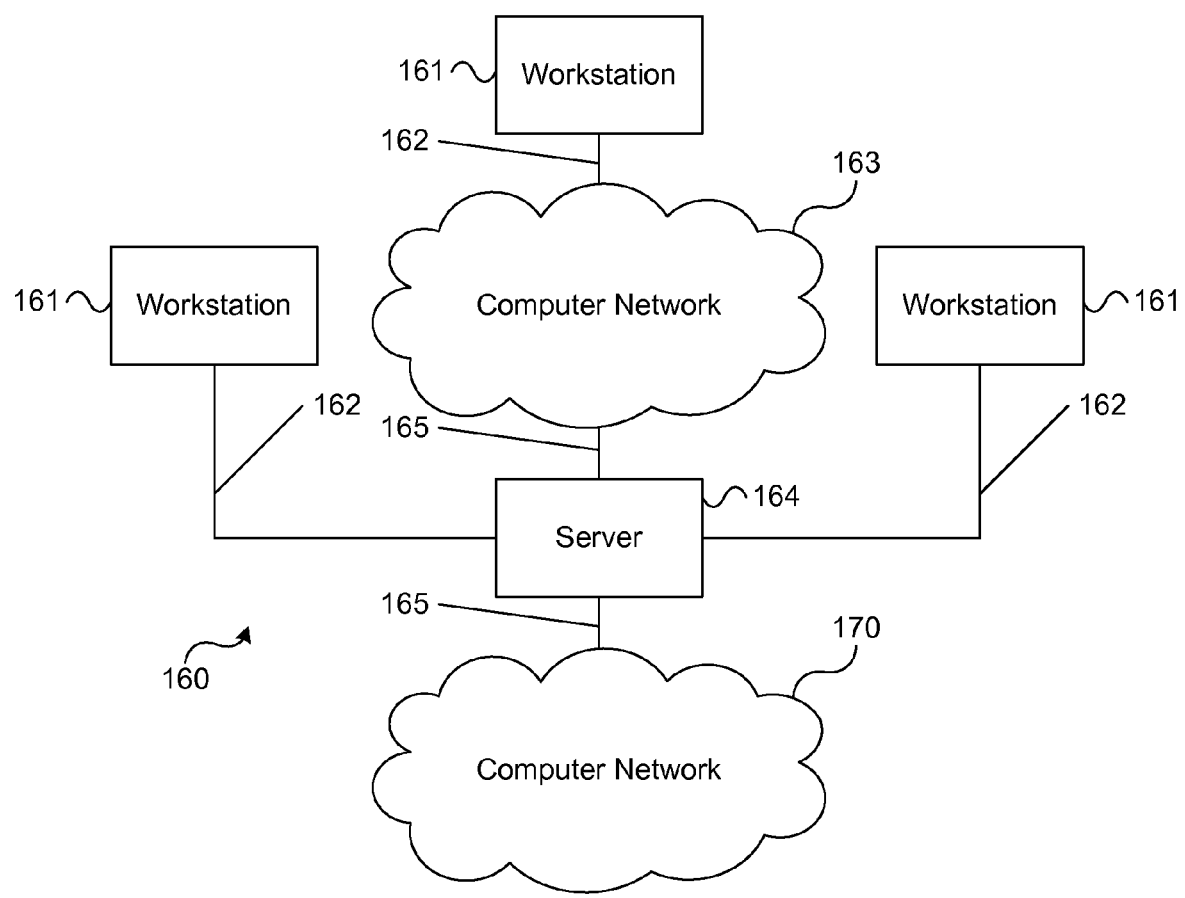
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

As introduced above, some aspects of the disclosure generally relate to detecting malware using revision control logs. In the discussion below, various examples illustrating how malware may be detected in accordance with one or more embodiments will be provided.

Figure 2:
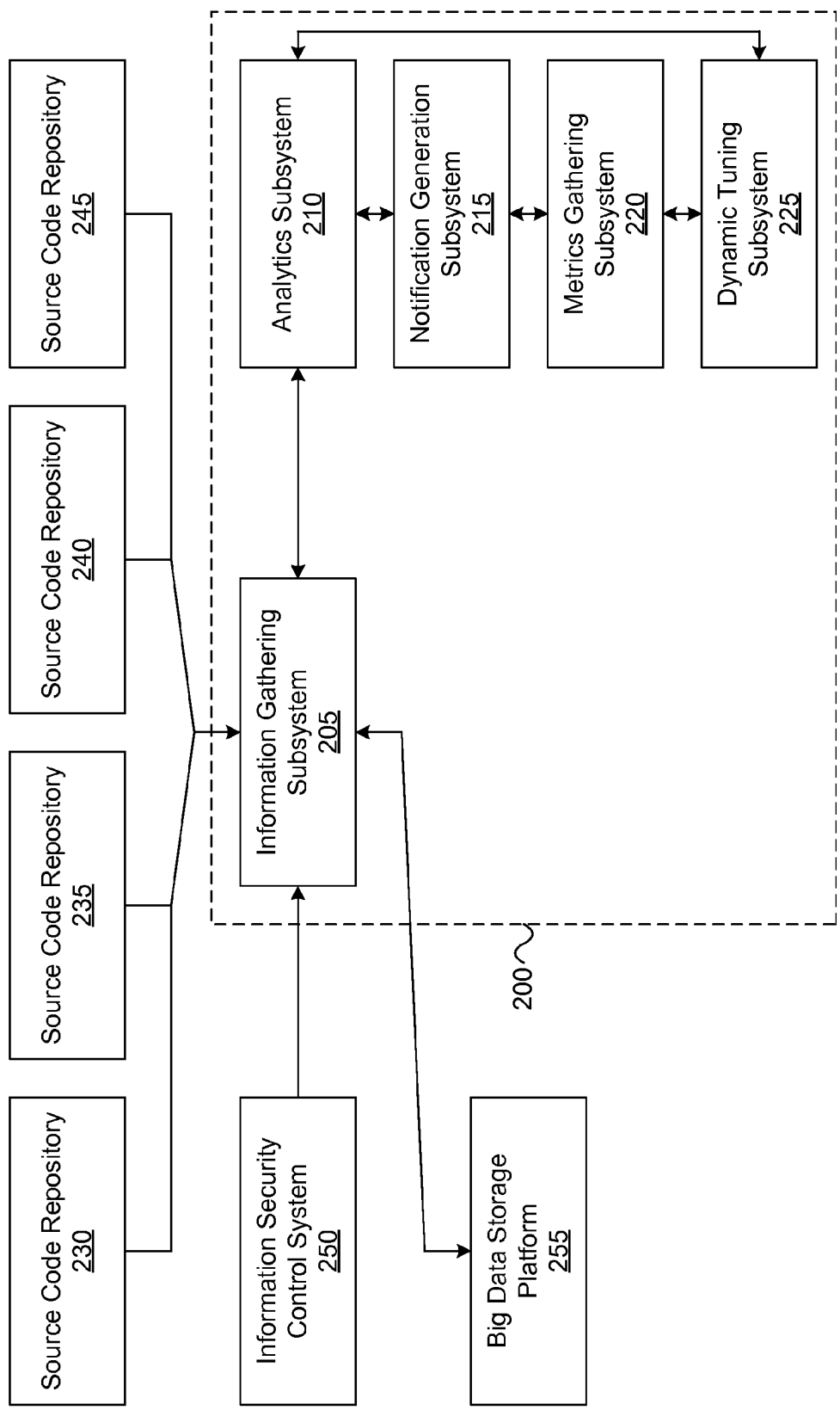
FIG. 2 illustrates an example of a system for detecting malware using revision control logs according to one or more embodiments.

FIG. 2 illustrates an example of a system 200 for detecting malware using revision control logs according to one or more embodiments. In some embodiments, system 200 may be implemented in one or more computing devices, which may include and/or incorporate one or more processors, one or more memories, and/or one or more aspects of the computing device 101 discussed above. In some instances, system 200 may include a number of different subsystems, databases, and/or libraries. In some arrangements, all of the subsystems included in system 200 may be included in and/or incorporated into a single computing device, while in other arrangements, each subsystem included in system 200 (and/or combinations thereof) may be included in and/or incorporated into a distinct and/or dedicated computing device. In addition, each of the databases and/or libraries included in system 200 may be included in and/or incorporated into the same computing device as one or more other subsystems of system 200, or, in other arrangements, may be included in and/or incorporated into distinct and/or dedicated computing devices (which, e.g., are communicatively coupled to and/or otherwise accessible to system 200 and/or its various subsystems).

As seen in FIG. 2, in some embodiments, system 200 may include an information gathering subsystem 205, an analytics subsystem 210, a notification generation subsystem 215, a metrics gathering subsystem 220, and a dynamic tuning subsystem 225. This arrangement represents one example configuration of system 200. In other embodiments, one or more elements of system 200 may be combined and/or additional and/or alternative subsystems may be included in addition to and/or instead of those shown in FIG. 2.

In some embodiments, information gathering subsystem 205 may be configured to gather revision control logs from various sources. The revision control logs may, for instance, identify one or more code changes, such as code changes that have been made (or are to be made) to one or more software applications. For example, each revision control log may include one or more data tables that include records of each change made to a particular set of source code and that identify, for each change, what lines of code were changed, which user made the change, what time the change was made, what application(s) may be affected by the change, what system(s) may be affected by the change, and/or where the code is located (e.g., in which source code repository, in which file(s), and/or the like).

In gathering the revision control logs, the information gathering subsystem 205 may, for example, obtain one or more revision control logs from different sources, such as source code repositories 230, 235, 240, and 245. Each of the source code repositories 230, 235, 240, and 245 may, for instance, be associated with different software management and/or revision control systems. Additionally or alternatively, the information gathering subsystem 205 may index the obtained revision control logs. For example, the information gathering subsystem 205 may index the obtained revision control logs by organizing the changes identified in the revision control logs based on the user and/or user account that made each change, based on the application(s) that each change affects, and/or the like. In indexing and organizing the changes in this manner, the information gathering subsystem 205 may, for instance, generate and store index key data that enables the various changes included in the revision control logs to be quickly searched and/or sorted (e.g., based on the user and/or user account that made each change, based on the application(s) that each change affects, and/or the like). Additionally or alternatively, in indexing and organizing the changes, the information gathering subsystem 205 may reconcile formatting differences between the revision control logs (which may, e.g., result from the revision control logs being obtained from different software management and/or revision control systems) by reformatting and/or otherwise reorganizing the information obtained about the various changes.

In one or more arrangements, information gathering subsystem 205 may additionally or alternatively be configured to obtain and/or access information security data from information security control system 250, which may be implemented by one or more physical computing devices and/or logical resources. This information security data may, for example, include information about various software developers and/or other users, such as information about the websites and/or other resources that each user has accessed and/or attempted to access, the web queries that each user has submitted, the data that each user has sent out of the organization and/or received from outside of the organization, and/or other user-specific risk information. Any and/or all of this information may, for instance, be collected and/or maintained by the information security control system 250. For example, information security control system 250 may include various firewalls, proxies, user login controls, and/or other elements to gather and/or collect any and/or all of this information security data, which may then be provided to the information gathering subsystem 205.

In one or more arrangements, information gathering subsystem 205 may additionally or alternatively be configured to retrieve information from a big data storage platform 255, which, like information security control system 250, may be implemented by one or more physical computing devices and/or logical resources. For example, the big data storage platform 255 may include a big data warehouse that is deployed and/or used by the organization or entity which may be implementing and/or utilizing system 200 to detect malware. In addition to being configured to retrieve information from the big data storage platform 255, information gathering subsystem 205 also may be configured to store information in the big data storage platform 255, such as the revision control log data and/or the information security data discussed above.

In some embodiments, analytics subsystem 210 may be configured to determine, based on one or more risk factors, whether a code change is potentially malicious. In particular, analytics subsystem 210 may be configured to analyze and/or evaluate the code changes identified in the revision control logs that are gathered by information gathering subsystem 205. The one or more risk factors, may for instance, include one or more user-based risk factors, which may, in some instances, be evaluated using information obtained from information security control system 250 and/or big data storage platform 255. In particular, the one or more user-based risk factors may be used in determining whether a particular change made by a particular user should be flagged as potentially malicious based on information that is known and/or available about the particular user and/or his or her relationship with the organization. For example, the one or more user-based risk factors (which may, e.g., be evaluated alone and/or together in any combination and/or sub-combination thereof) may include:

a. whether the particular user is going to be terminated within a predetermined amount of time (e.g., an employee whose name appears on a force reduction list and is scheduled for termination within a predetermined amount of time, a contractor who is approaching the term date on his or her contract and/or otherwise within a predetermined amount of time of such a term data, and/or the like);

b. whether the particular user is using a generic ID or user account to make source code changes instead of his or her own personal ID or user account;

c. whether the particular user has previously and/or recently sent source code outside of the organization (e.g., by emailing code outside of the organization or posting source code to a public website);

d. whether the particular user has previously and/or recently received source code from outside of the organization (e.g., from a public website, from an email, and/or the like);

e. whether the particular user has previously and/or recently attempted to save source code to and/or load source code from removable media (e.g., a thumb drive);

f. whether the particular user has previously and/or recently performed other potentially malicious behavior (e.g., proxy avoidance) using computer systems and/or networks that are operated by and/or monitored by the organization;

g. whether the particular user has previously and/or recently accessed and/or attempted to access one or more websites that are known to be malicious;

h. whether the particular user is using a user account that has been or should have been deleted and/or otherwise disabled; and/or i. whether the particular user otherwise has a history of risky and/or malicious use of computer systems and/or networks that are operated by and/or monitored by the organization.

Additionally or alternatively, in determining whether a particular code change is potentially malicious, analytics subsystem 210 may be configured to perform an outlier analysis on the various code changes that may be associated with the user and/or user account responsible for the particular code change. For example, given a particular user's previous and/or recent interactions with a particular source code repository and/or software application (whose code may, e.g., be managed by one or more of the source code repositories), analytics subsystem 210 may determine whether the particular code change being evaluated is an outlier and/or otherwise anomalous. In determining whether a particular code change is an outlier, the analytics subsystem 210 may evaluate various factors, which may, e.g., be evaluated alone and/or together in any combination and/or sub-combination thereof, and which may include:

a. whether the particular user has previously and/or recently made other code changes with respect to the particular application;
b. whether the particular user has previously and/or recently made other code changes in the particular source code repository;
c. whether the particular user has previously and/or recently made an unusually large and/or small number of code changes (e.g., outside of a predetermined range of expected and/or predicted values) with respect to the particular application; and
d. whether the particular user has previously and/or recently made an unusually large and/or small number of code changes (e.g., outside of a predetermined range of expected and/or predicted values) in the particular source code repository.

In some embodiments, notification generation subsystem 215 may be configured to generate a notification indicating that one or more particular code changes are potentially malicious (e.g., based on the analysis and/or determinations made by analytics subsystem 210). Additionally or alternatively, notification generation subsystem 215 may be configured to send the generated notification(s) and/or cause such notifications(s) to be sent. For example, the notification(s) generated by notification generation subsystem 215 may be sent to one or more designated code reviewers, administrative users, and/or other individuals. In this manner, the notification(s) thus may alert others of the potentially malicious code change(s) and/or cause the code change(s) to be reviewed and/or approved before they are implemented in production code.

In some embodiments, metrics gathering subsystem 220 may be configured to receive data indicating whether a particular code change that was previously identified as potentially malicious (e.g., by analytics subsystem 210) is actually malicious. For example, metrics gathering subsystem 220 may receive such data from one or more code reviewers, administrative users, and/or other individuals (who may, e.g., have been notified about a potentially malicious code change by notification generation subsystem 215) after they have conducted a manual review of the potentially malicious code change to determine whether it is actually malicious or is instead a legitimate code change.

In some embodiments, dynamic tuning subsystem 225 may be configured to dynamically modify one or more of the risk factors (e.g., one or more of the risk factors used by analytics subsystem 210 in evaluating various code changes) based on the data received by metrics gathering subsystem 220. For example, in dynamically modifying the one or more risk factors, dynamic tuning subsystem 225 may tune and/or otherwise adjust the weights that may be assigned to particular risk factors (and, e.g., used by analytics subsystem 210 in determining whether to flag a particular code change as potentially malicious). By dynamically modifying the risk factors, dynamic tuning subsystem 225 may ensure that, over time, system 200 can better identify code changes that are actually malicious, while flagging fewer code changes that are actually legitimate as potentially malicious. These features may thus reduce the false positive rate for analytics subsystem 210 and system 200, and thereby improve overall system performance and efficiency.

As indicated above, these are examples of the subsystems, databases, and/or other elements that may be included in system 200 in some embodiments, as well as some of the functions that may be performed (e.g., by system 200 and its various subsystems). In other embodiments, additional and/or alternative subsystems, databases, and/or other elements may similarly be included, and/or other functions may be performed, in addition to and/or instead of those discussed above.

Having described an example system that may be used in detecting malware using revision control logs in some embodiments, an example of a method that may, in some embodiments, be performed (e.g., by such a system 200; by another computing device, such as computing device 101; and/or the like) will now be discussed in greater detail with respect to FIG. 3.

Figure 3:
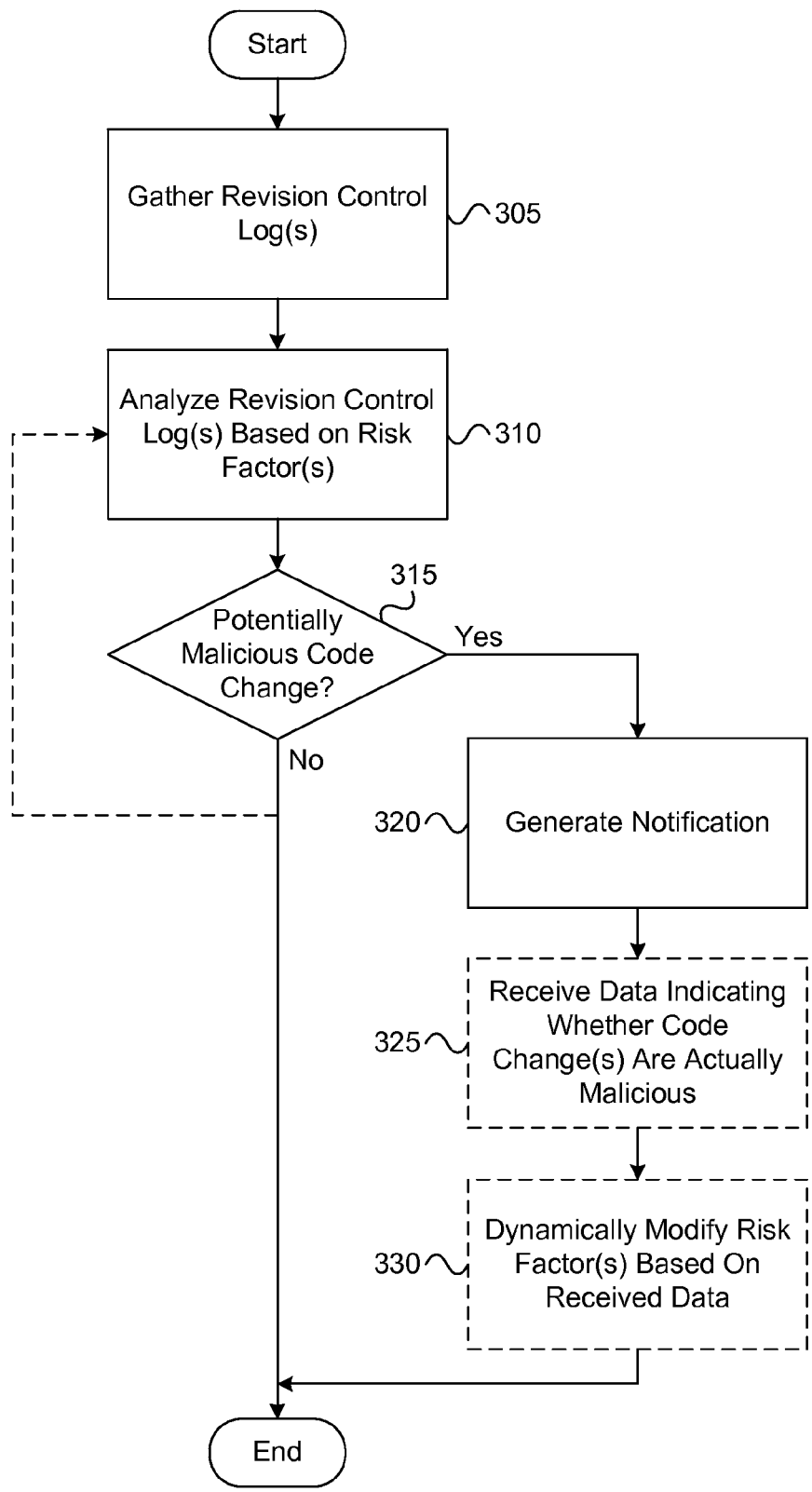
FIG. 3 illustrates a flowchart that depicts a method of detecting malware using revision control logs according to one or more embodiments.

FIG. 3 illustrates a flowchart that depicts a method of detecting malware using revision control logs according to one or more embodiments. In some embodiments, the example method illustrated in FIG. 3 may be performed by a computing device, which may include and/or implement one or more aspects of computing device 101. In additional and/or alternative embodiments, the example method illustrated in FIG. 3 may be performed by a computer system, such as system 200. In other embodiments, the example method illustrated in FIG. 3 may be implemented in and/or may otherwise be embodied in computer-readable instructions that may be stored in a computer-readable medium, such as a memory.

As seen in FIG. 3, the method may be initiated in step 305, in which one or more revision control logs may be gathered. In addition, the revision control logs may identify one or more code changes. For example, in step 305, a computing device (which may, e.g., include or implement one or more aspects of computing device 101 and/or system 200) may gather one or more revision control logs. As discussed above, the revision control logs may identify one or more code changes that have, for instance, been made by a particular developer to source code for a particular application that is maintained in a particular source code repository.

In some embodiments, gathering the one or more revision control logs may include obtaining the one or more revision control logs from at least two different sources, and subsequently indexing the obtained revision control logs. For example, in gathering the one or more revision control logs, the computing device may obtain revision control logs from at least two different sources (e.g., two or more different source code repositories) and subsequently may index the revision control logs, as discussed above. In some instances, the revision control logs may, for instance, be indexed based on user identifier and/or other identity information associated with the developer that made each code change identified in the revision control logs. Additionally or alternatively, the revision control logs may, for instance, be indexed based on the application(s) affected by each code change. While these are some examples of the ways that the revision control logs may be indexed in some instances, the revision control logs may additionally or alternatively be similarly indexed based on other factors in other instances.

In some embodiments, the at least two different sources (e.g., from which the revision control logs are obtained) may include at least two different source code repositories associated with at least two different revision control systems. For example, in gathering the one or more revision control logs, the computing device may obtain revision control logs from different source code repositories that employ different revision control systems (e.g., relative to each other). The different revision control systems may, for instance, employ different data structures and/or organizational structures in tracking code changes, and as discussed above, the computing device may reconcile these differences in indexing the revision control logs.

In step 310, the one or more revision control logs may be analyzed based on one or more risk factors. For example, in step 310, the computing device may analyze the one or more revision control logs gathered in step 305 based on one or more risk factors to determine whether any of the code changes identified in the revision control logs are potentially malicious. As discussed above, the one or more risk factors may include one or more user-based risk factors, which may, for instance, evaluate the context surrounding the code change and the user who made the code change to determine whether the code change is potentially malicious.

For example, in step 310, the computing device may identify, as potentially malicious, a code change that has been made by a developer who is nearing his or her termination date, who has previously and/or recently accessed one or more malicious websites, and/or who has otherwise previously and/or recently run afoul of one or more information security policies. As discussed below, any code changes that are identified and/or flagged as being potentially malicious may be subjected to additional review by one or more other developers and/or administrators before they are implemented in production code, so as to determine whether the code changes represent a logic bomb or actual malware and, if so, to prevent the logic bomb or other malware from having any effect on production software and computer systems.

In some embodiments, determining that at least one code change is potentially malicious may include performing an outlier analysis on one or more code changes associated with a first user account. The outlier analysis may, for instance, be performed on its own or in combination with the risk factor analysis discussed above. For example, in determining whether a code change by a particular developer is potentially malicious and performing an outlier analysis, the computing device may analyze user account information that may include information about the developer's previous interactions with the source code being changed, the application being affected by the change, and/or the developer's previous interactions with the source code repository in which the change has been made. For example, if a particular developer normally checks in five pieces of code a week to a particular source code repository, but recently (e.g., within the last two days) has checked in twenty pieces of code to a different source code repository, the recently checked-in pieces of code may be flagged as potentially malicious by the computing device after performing the outlier analysis. In another example illustrating how the outlier analysis may be combined with the risk factor analysis discussed above, if a particular developer who normally makes very few code changes (e.g., less than five per week) turns in his or her notice of resignation and then makes an unusual number of code changes (e.g., more than five per week, or any at all in some instances), the computing device may flag any and/or all of the unusual code changes made by the developer as potentially malicious.

In step 315, it may be determined, based on the analysis conducted in step 310, whether at least one code change identified in the one or more revision control logs is potentially malicious. For example, in step 315, the computing device may determine whether any code changes were identified as potentially malicious during the analysis performed in step 310.

If it is determined, in step 315, that none of the code changes identified in the one or more revision control logs is potentially malicious, then the method may end. Additionally or alternatively, the method may return to step 310 and continue in a loop (e.g., such that the one or more revision control logs may be re-analyzed and it may be periodically re-determined whether any of the code changes identified in the one or more revision control logs are potentially malicious).

On the other hand, if it is determined, in step 315, that the at least one code change is potentially malicious, then in step 320, a notification indicating that the at least one code change is potentially malicious may be generated. For example, in step 320, the computing device may generate a notification indicating that one or more code changes were determined to be potentially malicious. Such a notification may, for instance, include information identifying the code change(s), what application(s) may be affected, and/or what source code repositories may be affected. In addition to generating the notification, the computing device may, in some instances, send the notification (e.g., to one or more designated code reviewers, administrative users, and/or other individuals) and/or cause the notification to be sent. As discussed above, such a notification may alert others of the potentially malicious code change(s) and, in some instances, cause the code change(s) to be reviewed and/or approved before they are implemented in production code.

In step 325, data indicating whether the at least one code change is actually malicious may be received. For example, after generating the notification regarding the at least one code change in step 320, the computing device may, in step 325, receive data indicating whether the at least one code change is actually malicious. For instance, the data indicating whether the at least one code change is actually malicious may be received from the one or more designated code reviewers, administrative users and/or other individuals who may have received the notification generated in step 320 and subsequently performed a manual review of the at least one code change to evaluate whether it is a legitimate code change or if it is an actually malicious attempt to embed malware into the software.

In step 330, at least one risk factor of the one or more risk factors may be dynamically modified based on the received data. For example, based on the data received in step 325, the computing device may, in step 330, dynamically modify at least one risk factor of the one or more risk factors by tuning and/or otherwise adjusting the weights that may be assigned to one or more of the risk factors and used in determining whether future code changes are potentially malicious. Additionally or alternatively, in dynamically modifying one or more risk factors, the computing device may disable one or more risk factors (which may, e.g., be determined to not be effective indicators of whether a particular code change is potentially malicious) and/or activate one or more other risk factors (which may, e.g., be determined to be relatively effective indicators of whether a particular code change is potentially malicious). As discussed above, by adjusting these weights and/or otherwise dynamically modifying the risk factors, the computing device may improve its future performance by reducing the rate at which actually legitimate code changes are identified as potentially malicious and subjected to additional review.

Having described several examples of the processing that may be performed by a computing device in detecting malware using revision control logs in some embodiments, several example user interfaces that might be displayed and/or otherwise provided by a computing device, such as computing device 101 and/or system 200, in performing such processing and/or in otherwise implementing various aspects of the disclosure will now be discussed with respect to FIGS. 4 and 5.

Figure 4:
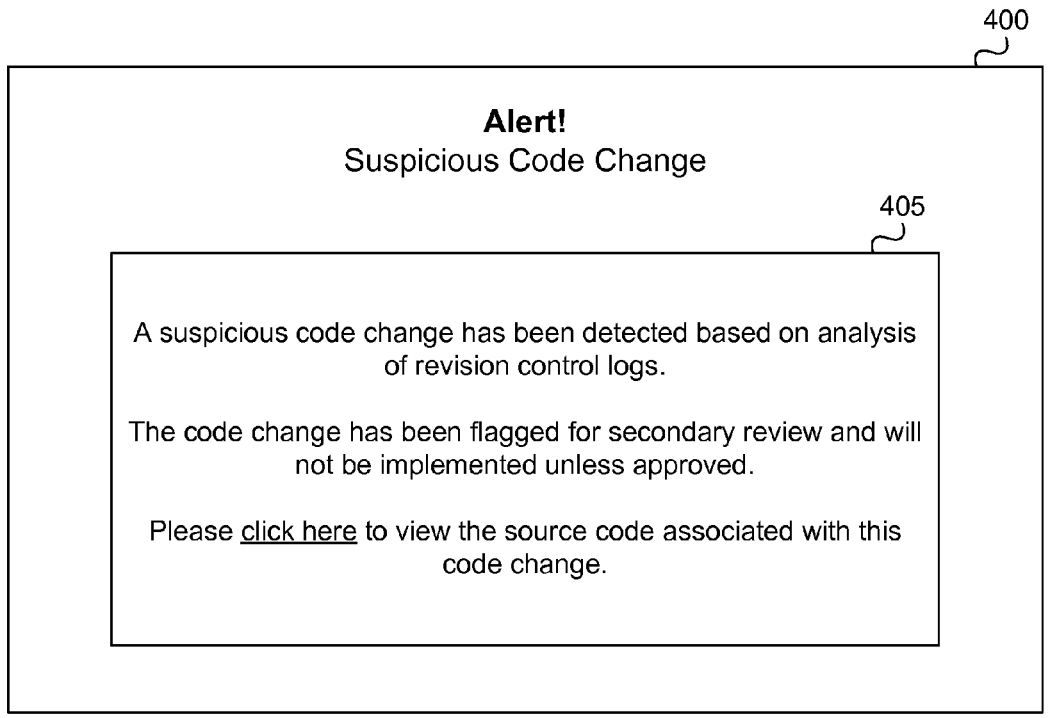
FIG. 4 illustrates an example of a user interface that may be displayed in notifying a user about a potentially malicious code change in one or more embodiments.

FIG. 4 illustrates an example of a user interface that may be displayed in notifying a user about a potentially malicious code change in one or more embodiments. As seen in FIG. 4, in some instances, a computing device implementing one or more aspects of the disclosure (e.g., computing device 101, system 200, and/or the like) may display and/or otherwise provide a user interface 400 that includes a notification about a potentially malicious code change (which may, e.g., be generated by a computing device, such as system 200, as in the examples discussed above). Such a user interface may, for example, enable a code reviewer, administrative user, or other individual to be alerted to the existence and detection of the potentially malicious code change.

In some arrangements, user interface 400 may include a notification area 405 in which information about the potentially malicious code change may be presented. For example, notification area 405 may include information indicating that a code change has been flagged as potentially malicious and will not be implemented in production code until a secondary review of the code change has been conducted (e.g., to evaluate whether the code change is actually malicious or, alternatively, legitimate). In addition, notification area 405 may include a link to the code change, which may, for instance, enable the user to quickly and easily access and view the code change (e.g., in the corresponding source code repository) so as to complete the manual review of the code change.

Figure 5:
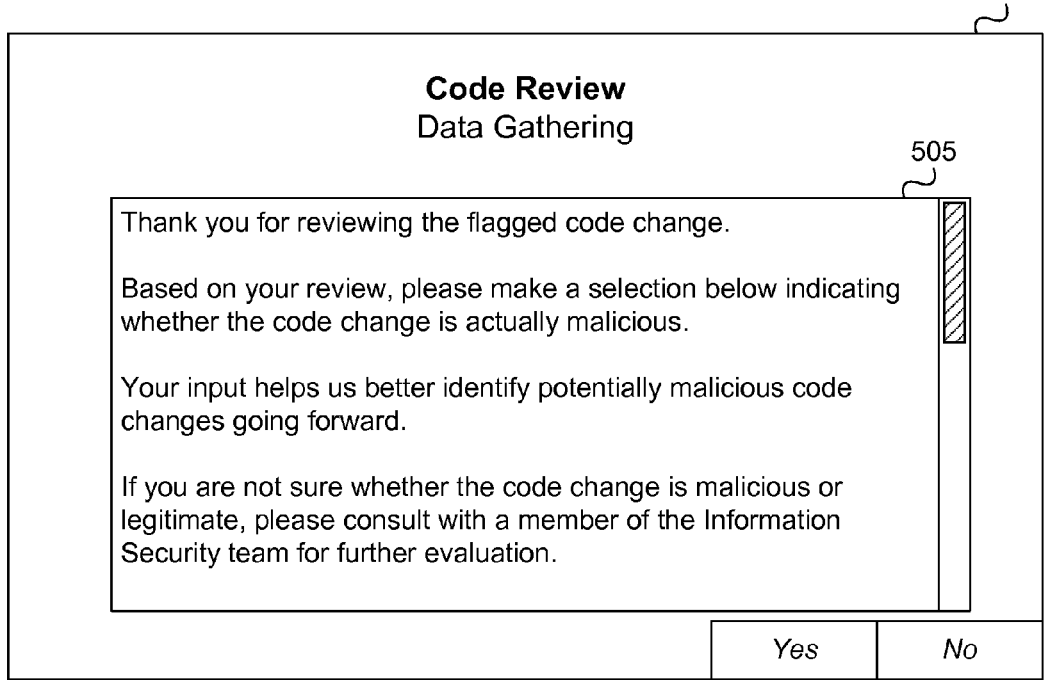
FIG. 5 illustrates an example of a user interface that may be displayed in receiving data indicating whether a code change is actually malicious in one or more embodiments.

FIG. 5 illustrates an example of a user interface that may be displayed in receiving data indicating whether a code change is actually malicious in one or more embodiments. As seen in FIG. 5, in some instances, a computing device implementing one or more aspects of the disclosure (e.g., computing device 101, system 200, and/or the like) may display and/or otherwise provide a user interface 500 after a user has been notified about a potentially malicious code change. Such a user interface may, for example, enable a user of the computing device to provide user input indicating whether the code change is legitimate or actually malicious after the user has completed a manual review of the particular code change.

In some arrangements, user interface 500 may include a notification area 505 in which information about the code change and/or various instructions for the user may be presented. For example, notification area 505 may include information instructing the user as to how to respond to the prompt being presented by user interface 500. In addition, user interface 500 may include one or more buttons, such as yes button 515 and no button 520, via which user input indicative of the user's response to the prompt may be received.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   gathering, by a computing device, one or more revision control logs, the one or more revision control logs identifying one or more code changes;
   determining, by the computing device, based on one or more risk factors, that at least one code change identified in the one or more revision control logs is potentially malicious;
   based on determining that the at least one code change is potentially malicious, generating, by the computing device, a notification indicating that the at least one code change is potentially malicious;
   after generating the notification regarding the at least one code change, receiving, by the computing device, data indicating whether the at least one code change is actually malicious; and
   dynamically modifying, by the computing device, at least one risk factor of the one or more risk factors based on the received data,
   wherein dynamically modifying the at least one risk factor of the one or more risk factors based on the received data comprises adjusting one or more weights assigned to the one or more risk factors to reduce a rate at which legitimate code changes are identified as potentially malicious, and
   wherein each revision control log of the one or more revision control logs includes one or more data tables that include records of each change made to a particular set of source code, the records identifying, for each change made to the particular set of source code, one or more lines of code associated with the change, a user who made the change, one or more applications affected by the change, one or more systems affected by the change, and a location of the code associated with the change.

2. The method of claim 1, wherein gathering the one or more revision control logs includes:
   obtaining the one or more revision control logs from at least two different sources; and
   indexing the obtained revision control logs.

3. The method of claim 2, wherein the at least two different sources include at least two different source code repositories associated with at least two different revision control systems.

4. The method of claim 2, wherein indexing the obtained revision control logs includes organizing one or more changes identified in the obtained revision control logs based on one or more user accounts associated with the one or more changes identified in the obtained revision control logs.

5. The method of claim 1, wherein the one or more risk factors include one or more user-based risk factors.

6. The method of claim 1, wherein determining that at least one code change is potentially malicious includes performing an outlier analysis on one or more code changes associated with a first user account.

7. The method of claim 6, wherein performing the outlier analysis on the one or more code changes associated with the first user account includes:
   evaluating whether a user associated with the first user account has previously made other code changes with respect to a particular application associated with the at least one code change; and
   evaluating whether the user associated with the first user account has previously made other code changes with respect to a particular source code repository associated with the at least one code change.

8. The method of claim 1, wherein the one or more risk factors include one or more of: whether a user who made the at least one code change is going to be terminated in a predetermined amount of time, whether the user who made the at least one code change used a generic user account to make the at least one code change, whether the user who made the at least one code change has previously sent source code outside of an organization associated with the one or more revision control logs, whether the user who made the at least one code change has previously saved source code to removable media, whether the user who made the at least one code change has previously performed other potentially malicious behavior, whether the user who made the at least one code change has previously accessed one or more malicious websites, or whether the user who made the at least one code change has a history of risky use of computer systems operated by the organization.

9. The method of claim 1,
   wherein the notification is sent to one or more designated code reviewers for approval before the at least one code change is implemented in production code, and
   wherein the notification includes information identifying the at least one code change, one or more applications affected by the at least one code change, and one or more source code repositories affected by the at least one code change.

10. The method of claim 1, further comprising:
    presenting, by the computing device, a user interface that includes the notification and a link to the at least one code change that enables a user of the user interface to access the at least one code change in a source code repository.

11. The method of claim 10, wherein the data indicating whether the at least one code change is actually malicious is received as user input from the user.

12. A computing device, comprising:
    at least one microprocessor; and
    non-transitory memory storing computer readable instructions that, when executed by the at least one microprocessor, cause the computing device to:
        gather one or more revision control logs, the one or more revision control logs identifying one or more code changes;
        determine, based on one or more risk factors, that at least one code change identified in the one or more revision control logs is potentially malicious;
        based on determining that the at least one code change is potentially malicious, generate a notification indicating that the at least one code change is potentially malicious;
        after generating the notification regarding the at least one code change, receive data indicating whether the at least one code change is actually malicious; and
        dynamically modify at least one risk factor of the one or more risk factors based on the received data,
    wherein dynamically modifying the at least one risk factor of the one or more risk factors based on the received data comprises adjusting one or more weights assigned to the one or more risk factors to reduce a rate at which legitimate code changes are identified as potentially malicious, and
    wherein each revision control log of the one or more revision control logs includes one or more data tables that include records of each change made to a particular set of source code, the records identifying, for each change made to the particular set of source code, one or more lines of code associated with the change, a user who made the change, one or more applications affected by the change, one or more systems affected by the change, and a location of the code associated with the change.

13. The computing device of claim 12, wherein gathering the one or more revision control logs includes:
    obtaining the one or more revision control logs from at least two different sources, the at least two different sources comprising a first source code repository that employs a first revision control system and a second source code repository that employs a second revision control system different from the first revision control system; and
    indexing the obtained revision control logs.

14. The computing device of claim 13, wherein the at least two different sources include at least two different source code repositories associated with at least two different revision control systems.

15. The computing device of claim 12, wherein the one or more risk factors include one or more user-based risk factors.

16. The computing device of claim 12, wherein determining that at least one code change is potentially malicious includes performing an outlier analysis on one or more code changes associated with a first user account.

17. One or more non-transitory computer-readable media having computer-executable instructions stored thereon that, when executed by a computing device, cause the computing device to:
    gather one or more revision control logs, the one or more revision control logs identifying one or more code changes;
    determine, based on one or more risk factors, that at least one code change identified in the one or more revision control logs is potentially malicious;
    based on determining that the at least one code change is potentially malicious, generate a notification indicating that the at least one code change is potentially malicious;
    after generating the notification regarding the at least one code change, receive data indicating whether the at least one code change is actually malicious; and
    dynamically modify at least one risk factor of the one or more risk factors based on the received data,
    wherein dynamically modifying the at least one risk factor of the one or more risk factors based on the received data comprises adjusting one or more weights assigned to the one or more risk factors to reduce a rate at which legitimate code changes are identified as potentially malicious, and wherein each revision control log of the one or more revision control logs includes one or more data tables that include records of each change made to a particular set of source code, the records identifying, for each change made to the particular set of source code, one or more lines of code associated with the change, a user who made the change, one or more applications affected by the change, one or more systems affected by the change, and a location of the code associated with the change.

18. The one or more non-transitory computer-readable media of claim 17, wherein gathering the one or more revision control logs includes:

obtaining the one or more revision control logs from at least two different sources; and indexing the obtained revision control logs.

19. The one or more non-transitory computer-readable media of claim 18, wherein the at least two different sources include at least two different source code repositories associated with at least two different revision control systems.

20. The one or more non-transitory computer-readable media of claim 17, wherein the one or more risk factors include one or more user-based risk factors.

21. The one or more non-transitory computer-readable media of claim 17, wherein determining that at least one code change is potentially malicious includes performing an outlier analysis on one or more code changes associated with a first user account.

* * * * *